United States Patent
Go (10) Patent No.: US 8,437,264 B1
(45) Date of Patent: May 7, 2013

(54) LINK MICROBENCHMARKING WITH IDLE LINK CORRECTION

(75) Inventor: Jared Go, Santa Clara, CA (US)

(73) Assignee: Hobnob, Inc., Palo Alto, CA (US)

( * ) Notice: Subject to any disclaimer, the term of this patent is extended or adjusted under 35 U.S.C. 154(b) by 0 days.

(21) Appl. No.: 13/475,258

(22) Filed: May 18, 2012

(51) Int. Cl.
*H04L 12/26* (2006.01)

(52) U.S. Cl.
USPC .. 370/251; 370/252; 370/395.21; 370/395.41

(58) Field of Classification Search ............ 370/238, 370/252, 255, 465, 251, 395.21, 395.41; 455/412.1, 450
See application file for complete search history.

(56) References Cited

U.S. PATENT DOCUMENTS

| | | | | |
|---|---|---|---|---|
| 5,170,393 | A * | 12/1992 | Peterson et al. | 370/255 |
| 2004/0152452 | A1 * | 8/2004 | Jones et al. | 455/412.1 |
| 2005/0286426 | A1 * | 12/2005 | Padhye et al. | 370/238 |
| 2007/0060166 | A1 * | 3/2007 | Kitamura et al. | 455/450 |
| 2010/0215053 | A1 * | 8/2010 | Chakareski et al. | 370/465 |
| 2011/0222431 | A1 * | 9/2011 | Oue et al. | 370/252 |

OTHER PUBLICATIONS

Ribeiro et al., PathChirp: Efficient Available Bandwidth Estimation for Network Paths, Passive and Active Measurement Workshop, RICE University, Apr. 2003.

Dovrolis et al., Pathrate A measurement tool for the capacity of network paths, Jan. 2004.

Jain et al., Pathload: A Measurement Tool for End-to-End Available Bandwidth, In Proceeding of Passive and Active Measurements (PAM) workshop, 2002.

* cited by examiner

*Primary Examiner* — Hassan Kizou
*Assistant Examiner* — Toan Nguyen
(74) *Attorney, Agent, or Firm* — Van Pelt, Yi & James LLP (57) ABSTRACT

Measuring the speed of a link is disclosed. An initial packet train having an initial length over the link is sent. A speed result is determined based at least in part on an actual time of reception of individual packets in the packet train. The quality of the speed result for the initial packet train is evaluated according to a constraint. A determination is made as to whether to send a subsequent packet train based at least in part on the quality of the speed result.

26 Claims, 7 Drawing Sheets

LINK MICROBENCHMARKING WITH IDLE LINK CORRECTION

BACKGROUND OF THE INVENTION

Bandwidth estimation can be used to determine the estimated throughput between pairs of nodes in a communications network. Unfortunately, performing bandwidth estimation can be both time and resource intensive. Therefore, improvements in bandwidth estimation techniques would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

On a network where information can be transmitted between nodes, bandwidth estimation comprises techniques used to determine the estimated throughput (e.g., bandwidth) between pairs of nodes in a communications network. The throughput between the pair of nodes can be dependent on any of a large number of factors which may vary at different time scales. For example, the throughput may relate to the capacity of the physical links between nodes (e.g., 10 Mbit Ethernet, Gigabit Ethernet, Fiber, DSL, etc.). The throughput may also relate to the pattern of links (or path including multiple links) through a network and the performance of the various network components along the way (e.g., routers, switches, etc.). As yet another example, the throughput may be related to the instantaneous congestion of links, which may be dependent on the usage of a network by other users.

For data transmitted over wireless links, there is also a wide range of additional complicating factors when estimating bandwidth. For example, interference can cause orders of magnitude greater packet loss than is typically seen on a wired network, which should be taken into account by a bandwidth estimation algorithm. For example, wireless protocols which implement power saving techniques typically introduce large buffering delays which can significantly affect estimation. As another example, cellular phones and their components (e.g., modems) may operate in a variety of modes (e.g., Forward Access Channel mode, Shared Channel mode, etc.), with each of these modes having different power consumption and throughput. As yet another example, cellular protocols typically have multiple modes for client devices which correspond to different throughput and power consumption levels. Because of the different operating modes, a connection may appear to have different characteristics (e.g., throughput) depending on the mode that a device may be in. For example, if the bandwidth of a link is estimated while a device is in a low-power idle mode, then the estimated bandwidth may be lower than what the device is capable of providing in a normal, higher-power mode of operation. For example, if a device (e.g., modem) is in a shared channel state that is relatively slow, the device may "wake-up" and enter another state or mode if a large amount of data is transmitted. In this state, the device may consume 3-4× more power, and after a period of time when traffic has been reduced, the device may return to its low power state.

When multiple links are used to transmit information (also referred to herein as "aggregation"), the assignment of data to a particular link may be based on link performance information. One source of link performance information is a priori information provided by a modem associated with a link about its connection rate. Unfortunately, the modem-provided information can be problematic, as throughput constraints often come from areas such as interference, loss, congestion, or tower backhaul capacity limits, which are typically unaccounted for by the modem's reports.

Link microbenchmarking is disclosed. Using the techniques described herein, bandwidth estimation can be performed scalably, transparently, and in real time so that the total amount of data transferred to enable real-time detection of changes in throughput can be reduced, bidirectional estimates can be provided, impacting user traffic can be avoided, and links ranging from low bandwidth wireless links (e.g., 2G cellular~80 Kbps) to high bandwidth links (e.g., 4G, WiFi, wired connections such as 1 Gbps fiber or Ethernet, etc.) can be estimated with tunable precision (e.g., trading the amount of transferred data with estimation accuracy), while compensating for errors that can be introduced due to idle/low power modes or random delays such as jitter.

Figure 1:
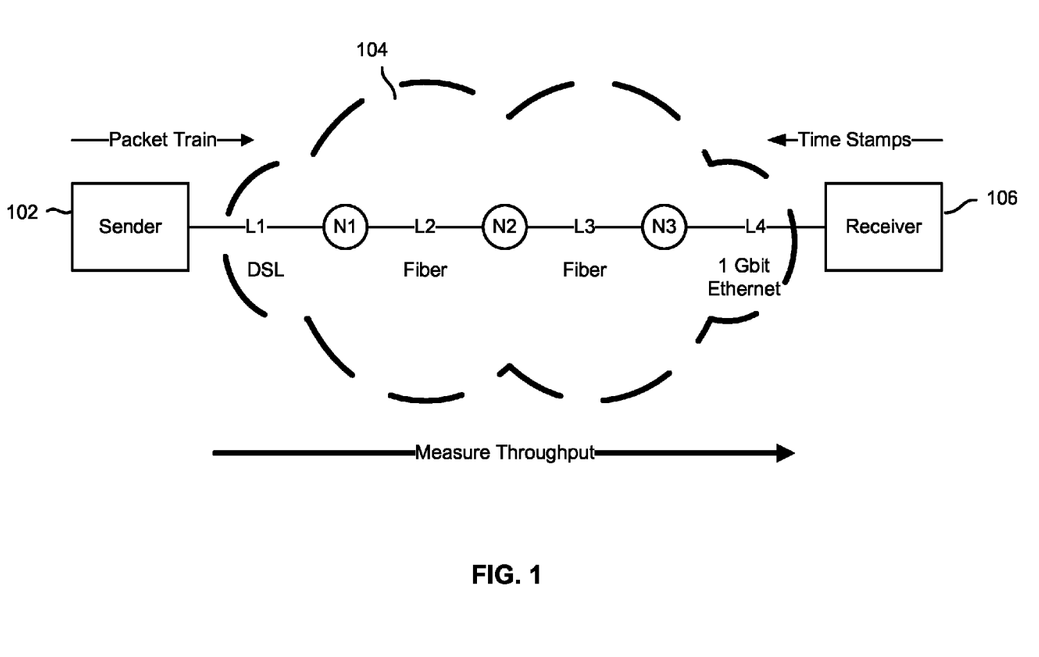
FIG. 1 is a block diagram illustrating an example of an environment in which link microbenchmarking is performed.

FIG. 1 is a block diagram illustrating an example of an environment in which link microbenchmarking is performed. In the example shown, sender 102 and receiver 106 are configured to perform link microbenchmarking in order to estimate the throughput (e.g., bandwidth) between the two nodes.

One example of link microbenchmarking is to perform a multi-phase algorithm, where multiple rounds of packet trains of increasing length are transmitted over a link from a sender node to a receiver node until a bandwidth estimate of satisfactory accuracy is determined. The receipt of the individual packets in the packet train can be time-stamped by the receiver node and used to estimate the bandwidth of the link by evaluating metrics such as the total dispersion of a packet train, distribution of inter-packet spacings, statistical measures of the distribution, or any other appropriate metrics. The size of the packet trains can be increased in subsequent rounds of a benchmark test until a packet train of suitable length has been transmitted such that the results of the estimation are determined to be acceptable. One example of a suitable length is a length that results in a total experienced dispersion (spreading of packets in the packet train caused by travelling through links of limited bandwidth) that is predominantly due to the constrained bandwidth of the link under consideration, while effects such as jitter and other random delays contribute insignificantly to the total experienced dispersion in comparison. By performing a multi-round benchmark test (e.g., where the size is incremented until an acceptable result is determined), as little data as is necessary to determine a satisfactory speed result (e.g., bandwidth estimate) is transmitted.

In some embodiments, sender 102 and receiver 106 comprise a client and a server. In some embodiments, link microbenchmarking is performed to estimate the throughput of a link (or links) available to a client. In various embodiments, a client comprises a device that has available to it one or more links provided by one or more telecommunications carriers (i.e., providers of telecommunications services such as telephony and data communications access), such as wireless carriers (e.g., Verizon, AT&T, T-mobile, Sprint, etc.), ISPs (Comcast, AT&T, etc.), or any other appropriate network access provider or telecommunications carriers to access a network. One example of a client device includes a device (e.g., laptop, smartphone, tablet, desktop, etc.) that is configured to communicate with a plurality of wireless carriers. In some embodiments, the device includes several slots (e.g., USB, PCMCIA, ExpressCard, MiniPCI, MiniPCI Express, and/or any other appropriate peripheral interfaces) into which wireless cards corresponding to each of the wireless carriers is inserted. In some embodiments, the device uses off-the-shelf components, such as consumer wireless cards that are typically sold bundled with a monthly data plan. In some embodiments, the device may also use custom hardware. In various embodiments, the device supports various wireless formats. If the device has access to other network connections, such as an Ethernet connection to network 104 or via an 802.11 hotspot, the device can be configured to make use of such links instead of or in addition to the links it has with wireless carriers.

In some embodiments, a server is configured to assist in the link microbenchmarking process (e.g., dedicated test server for link microbenchmarking). In some embodiments, a path including the link or links to be evaluated that are available to the client is formed between the client and the server such that the estimated throughput of the total path (which may include a plurality of links) is representative of the throughput of the link (or links) that are being benchmarked/evaluated. In some embodiments, a path is formed such that the link (or links) under consideration are likely to be the slowest links in the path. In this way, the throughput of the path would most likely be constrained by the bandwidth of the link (or one of the links) under consideration.

In some embodiments, the client device may act as either a sender (while the server acts as a receiver) or a receiver (while the server acts as a sender). In various embodiments, applications and/or hardware to perform link microbenchmarking are installed on the client and the server. In some embodiments, the respective roles of the client device and the server as sender/receiver or receiver/sender are based at least in part on the direction of the link microbenchmarking test being performed (e.g., link microbenchmarking can be performed bidirectionally). The direction of the link microbenchmarking test (i.e., direction that packet trains are being sent) may correspond to whether a test of the upload or download throughput (which typically differ) of a link or links under consideration is being performed.

In some embodiments, the amount of logic placed on either the client or server node to facilitate link microbenchmarking is adjustable such that one side may perform the majority of the processing, while the other side performs more simplistic functions. By isolating the logic, updates to link microbenchmarking may be limited to one side, while minimal changes are required on the opposing side to allow for the two sides to coordinate with each other.

In the example shown, sender 102 communicates with receiver 106 via a path through network 104. In various embodiments, network 104 comprises one or more of a wired network, a wireless network, a local area network, a wide area network, the Internet, or any other applicable network. In some embodiments, the path through network 104 includes one or more links. In some embodiments, the links can be links that are provided by telecommunications carriers. In some embodiments, the links can be links that are not provided by telecommunications carriers but may be used to connect to links provided by telecommunications carriers to access a network (e.g., through nodes such as modems, routers, switches, or any other appropriate nodes). For example, a desktop computer may have a 1 Gbps Ethernet connection to a router, which has a 1 Gbps Ethernet link to a modem which has a 1.5 Mbps DSL link provided by a telecommunications carrier (e.g., AT&T). As another example, a laptop may have an 802.11n wireless link to a wireless router that connects to a modem through a 1 Gbps Ethernet link, which may in turn connect to the broader Internet via a link provided by a telecommunications carrier. Links on a local intranet without Internet access can also be tested using link microbenchmarking.

In some embodiments, sender 102 is configured to send one or more packet trains to receiver 106 via the path through network 104. In some embodiments, a packet train includes a plurality of packets. In some embodiments, receiver 106 is configured to receive the one or more packet trains transmitted by sender 102 and timestamp the arrival of the individual packets included in the one or more packet trains. Receiver 106 can also be configured to return, for each received individual packet, a reply or acknowledgment packet including timing measurements (e.g., timestamp) to sender 102. Using the timing measurements, sender 102 can then estimate the throughput between itself and receiver 106. Other configurations are possible. For example, in some embodiments, receiver 106 is configured to timestamp each received packet and compute a throughput estimation based on the timestamp information. In some embodiments, instead of sending an acknowledgment packet for each received packet, receiver 106 returns a value representative of the bandwidth to sender 102.

In some embodiments, the path from sender 102 to receiver 106 is configured such that the bandwidth of the path is constrained by the link (or links) under consideration. In some instances, the one or more links under consideration are those links used by a device to connect to a network such as the Internet. For example, a laptop may have an 802.11b connection to a wireless router/modem that connects to a network such as the Internet via a link provided by an ISP or other telecommunications carrier (e.g., Comcast, Verizon, etc.). Link microbenchmarking can be performed to estimate the throughput of the laptop's connection to the Internet, which can include multiple links. In other instances, a device such as a cellular telephone may directly connect to a network such as the Internet through a link (e.g., 4G) provided by a telecommunications carrier (e.g., Verizon). Typically, the bandwidth of a path including multiple links is constrained by the slowest link in the path (i.e., a path is only as fast as its slowest link).

In the example of FIG. 1, sender 102 comprises a client device having a DSL link that is to be evaluated using link microbenchmarking. In this example, the upload speed of the DSL link is being evaluated. A path including the DSL link is established between sender 102 and receiver 106 (e.g., a test server in this example) that includes multiple links (e.g., network high speed backbone links) and nodes (e.g., routers, modems, and switches). In this example, the client device, acting as a sender, uploads and sends a packet train (that includes a plurality of packets) over the DSL link. The packet train traverses the path going through various nodes and links before arriving at the server that receives the individual packets in the packet train. In this example, the server timestamps the receipt of each of the individual packets in the sent packet train and for each received packet, returns an acknowledgment packet or other suitable reply including the timestamp and an identifier identifying the corresponding packet in the originally sent packet train (e.g., the ack packet has the same header as the corresponding originally sent packet) to the sender. The download throughput of the DSL link can also be tested by reversing the roles of the client and the server such that the server acts as a sender, sending packet trains that are received and processed by the client. In various embodiments, the client and the server both include the logic to act as either a sender and/or a receiver.

Figure 2:
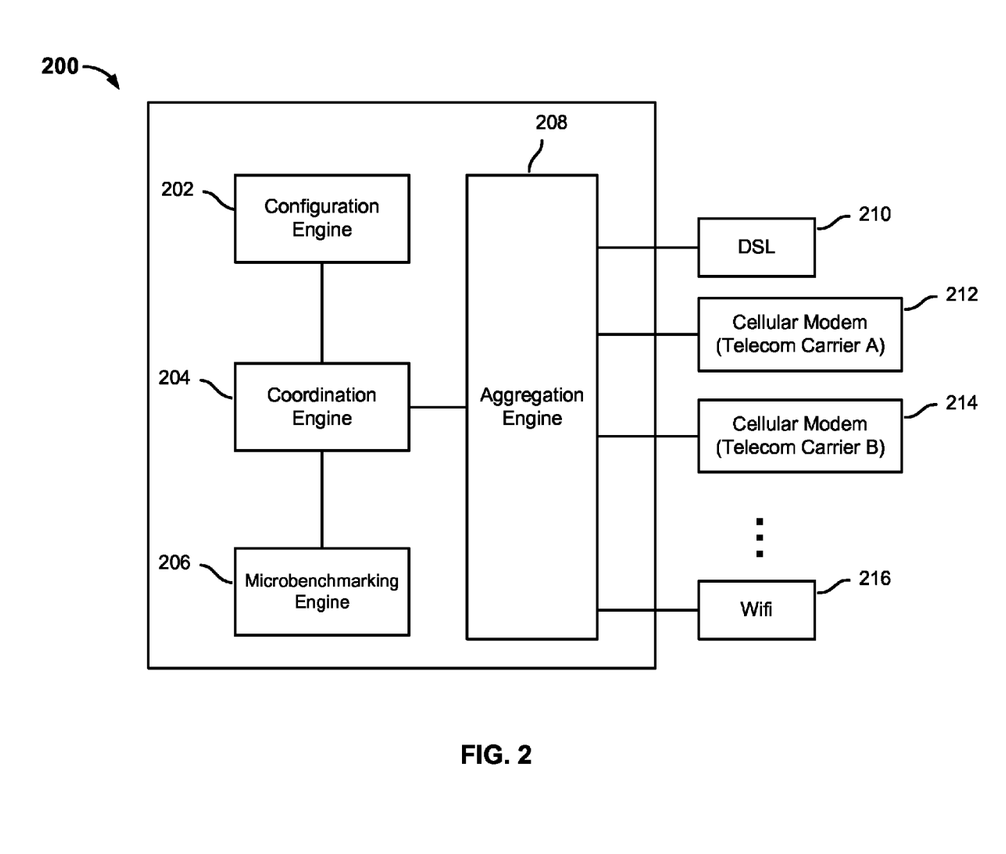
FIG. 2 is a block diagram illustrating an embodiment of a sender system for performing link microbenchmarking.

FIG. 2 is a block diagram illustrating an embodiment of a sender system for performing link microbenchmarking. In some embodiments, the sender system of FIG. 2 is an example of sender 102 of FIG. 1. In the example shown, sender system 200 includes configuration engine 202, coordination engine 204, microbenchmarking engine 206, and aggregation engine 208. The configuration engine allows users to configure microbenchmarking. The coordination engine coordinates and/or schedules the running of link microbenchmark tests. The microbenchmarking engine tracks, analyzes, and stores information collected during microbenchmarking and determines a speed result and other link performance information based on the analysis. In some embodiments, link performance information includes information obtained from a driver used to communicate with a link. The aggregation engine lets users transmit information over a plurality of links based on the link performance information. Engines 202-208 can be implemented in a variety of ways, including as software and/or in an embedded platform (e.g., embedded in hardware, a router, etc.). Sender system 200 can be configured to evaluate the performance of multiple links of a variety of types, such as DSL, cellular (e.g., 2G, 3G, 4G, WiMax, EDGE, GPRS, etc.), Wifi (e.g., 802.11a/b/g/n/ac, etc.), Cable, Ethernet (e.g., 100 Mbps, 1 Gbps, etc.), and so forth. In some embodiments, a sender system includes drivers to communicate with each of the plurality of links (e.g., 210-216) associated with the sender system.

Configuration engine 202 receives as input parameters used to configure link microbenchmarking. The parameters can include default parameters, such as a default number of packets in an initial packet train (e.g., 2) and a default packet size (e.g., 1024 bytes). The parameters can include tunable parameters and can be received from and/or inputted by a user. The base number of packets included in an initial packet train and base number of bytes per packet can be tunable parameters.

Another example of a tunable parameter is a dispersion threshold, which may be expressed as a unit of time (e.g., 100 ms), or any other appropriate measure. In some embodiments, a link is associated with a corresponding dispersion threshold. For example, the link dispersion threshold may be known a priori and/or determined prior to the running of a test. In some embodiments, link dispersion threshold is based at least in part on historical data (e.g., from previous tests) associated with the link. In some embodiments, the link dispersion threshold is based at least in part on known or previously determined characteristics of a link (e.g., theoretical bandwidth of a link, modem modes, expected jitter, wake up time, etc.).

Another example of a tunable parameter is a nominal test frequency indicating how often a benchmark test is performed for a link. For example, the test frequency can indicate an amount of time between tests of various links. In some embodiments, the test frequency is randomized to avoid bunching of microbenchmarking tests. For example, bunching may occur if a large number of links are benchmarked simultaneously, causing a noticeable impact to user traffic as all links will have data sent on them temporarily.

Another example of a tunable parameter is the model used when incrementing the length of a packet train in subsequent rounds of a microbenchmark test. For example, an exponential model (e.g., packet train length increases by a power of 2 from one round to the next) or a linear model can be specified.

Tunable parameters can also include disqualification criteria. Disqualification criteria can be used to disqualify or invalidate a microbenchmark test or a round of a test. In various embodiments, disqualification criteria may include a value or measure such as a count, percentage, etc. representing or indicating an allowable number of packets per packet train that may be lost before a round is disqualified/invalidated.

Tunable parameters can also include quality criteria. Quality criteria can be used to evaluate the quality of a bandwidth estimation benchmark or a result of the benchmark. In some embodiments, quality criteria include statistical measures determined from data collected or determined regarding link microbenchmarking. In various embodiments, statistical measures include measures associated with inter-packet spacings (i.e., time between arrival of consecutive packets in a packet train at a receiver), such as medians, means, standard deviations, distributions (e.g., of the inter-packet spacings), etc. Quality criteria can also include cutoff values used to identify statistical outliers of inter-packing spacings. In some embodiments, quality criteria are used to determine whether a link is performing normally or as expected or if there are bubbles or gaps in the inter-packet spacing, for example, due to increased traffic of a link, or due to modem switching or other effects, which can cause inter-packet spacing to deviate widely.

Coordination engine 204 coordinates the running of link microbenchmarking tests. As one example, coordination engine 204 manages the scheduling of benchmarks, how often benchmarks are performed, how benchmarks across several links are managed, etc. Coordination engine 204 includes one or more state machines used to track the status of microbenchmarks being performed on each link being tested.

Coordination engine 204 can take into account user preferences. For example, a user can indicate that a certain modem or card is not to be used for communicating (e.g., user has indicated that Verizon 3G modem is not to be used because they are close to the bandwidth cap of their data plan). In such a scenario, the link associated with the connection indicated not to be used is not benchmarked.

The coordination engine manages benchmarking of links using the tunable parameters received by the configuration engine. For example, using scheduling parameters received from the configuration engine, the coordination engine can randomize the running of benchmarks. The coordination engine can also receive data associated with the benchmark test (e.g., acknowledgment packets including timestamps from receiver 106 or other information obtained from drivers associated with links) and send the data to microbenchmarking engine 206.

Microbenchmarking engine 206 benchmarks the one or more links under consideration. In some embodiments, microbenchmarking engine comprises a multi-phase algorithm that tracks data across multiple microbenchmarking rounds and runs (where a single microbenchmark run/test may include multiple rounds). In addition to tracking data for each phase of a microbenchmark test, microbenchmarking engine 206 can store information and results of the current as well as previous microbenchmarks (e.g., estimated throughput of link, length of packet train in final round of previous run, inter-packet spacings, statistical measures of distribution of inter-packet spacings, etc.), which can be used to allow for more rapid convergence of a bandwidth estimate for a subsequent microbenchmark run.

Aggregation engine 208 transfers data over the links based on the results of link microbenchmarking. In some embodiments, aggregation engine 208 is configured to communicate over the links via drivers corresponding to each of the plurality of available links (e.g., links 210-216).

Figure 3:
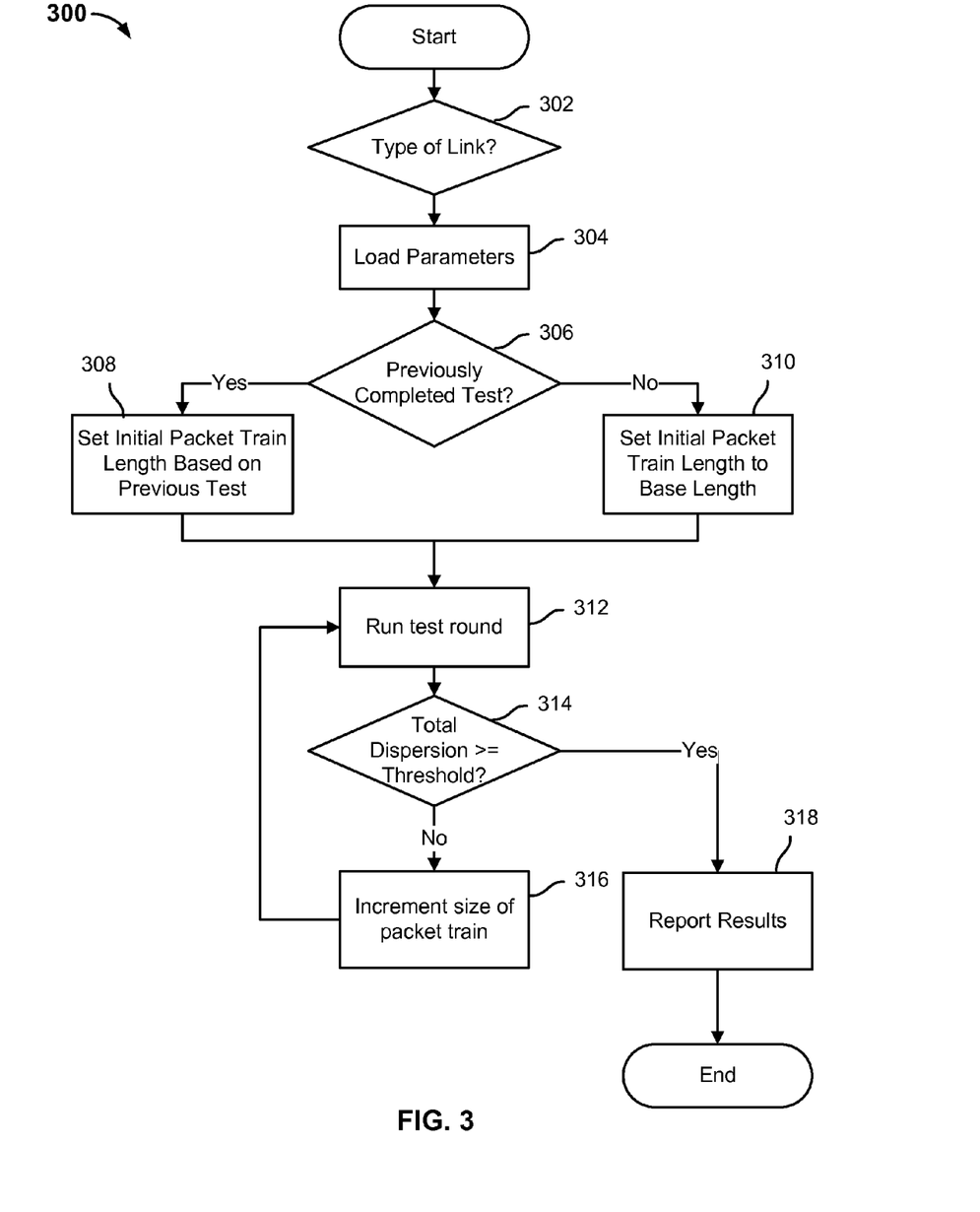
FIG. 3 is a flow diagram illustrating an embodiment of a process for performing link microbenchmarking.

FIG. 3 is a flow diagram illustrating an embodiment of a process for performing link microbenchmarking. In some embodiments, process 300 is executed by microbenchmarking engine 206 of FIG. 2. The process begins at 302 when the type of link (e.g., Verizon/AT&T 3G, 4G, DSL, Cable, WiFi, etc.) to be tested is determined. At 304, parameters for the test to be performed are loaded. The parameters can be loaded in a variety of ways. For example, the parameters loaded can be based at least in part on the type of link determined in 302. The parameters can also be received from a configuration engine such as configuration engine 202 of FIG. 2.

At 306, it is determined whether there is a previously completed test of the link. If there is a previously completed test (308), the length of the initial packet train of the initial round of the current microbenchmark test is determined based at least in part on a previously completed test. In some embodiments, the initial length of the packet train of the initial round of the current microbenchmark is set to the length of a packet train in one of the rounds of the previously completed test. For example, the length of the initial packet train of the initial round of the current microbenchmark test can be set to the length of the packet train in the second to last round of the previously completed test or to the length required to obtain a previous measurement of satisfactory quality. This allows the test to avoid having to start from a base packet length and can allow for more rapid convergence to a bandwidth estimate.

If there is not a previously completed test (310), the length of the initial packet train of the initial round of the current microbenchmark test is set to a base number of packets (e.g., 2) of a base size (e.g., 1024 bytes). In some embodiments, the base number of packets and base packet size are received from a configuration engine such as configuration engine 202 of FIG. 2. In some embodiments, each link to be tested is associated with a base packet length and base packet size corresponding to the type of a given link. In some embodiments, the base packet size and base number of packets are default parameters.

In some embodiments, the initial packet train is used to "wake up" a modem if it is in an idle mode. A particular packet train size for the initial packet train may be determined that is used to wake up the link. For example, an idle link may not wake up until a large enough train (e.g., 8-10 kB train) is sent, but the modem requires a ramp up time to switch between multiple modes that may require a long delay (e.g., greater than 1000 ms), which would adversely affect a bandwidth estimate. In some embodiments, the initial round of the test is pre-loaded by sending a slightly larger train initially to wake up a modem. In some embodiments, the data resulting from the pre-loaded "wake up" packet train is discarded, and only data resulting from packet trains sent subsequent to the "wake-up" train are collected and used to determine a bandwidth estimate. By sending a packet train to first "wake up" an idle link, errors due to idle links can be compensated for or corrected.

At 312, a round of the benchmark test is run with a packet train with a length or size as determined in 308 or 310 is transmitted from a sender such as sender 102 of FIG. 1 to a receiver such as receiver 106 of FIG. 1 over a link under consideration. The packets in the packet train can be sent out over a link together in a cluster or tight burst in a continuous manner so that they are transmitted without interruption (e.g., without intervening packets from user traffic breaking up the packet train).

In some embodiments, additional data is sent along with the packet train. In various embodiments, the additional data includes a unique identifier for the microbenchmark round, packet indexes of individual packets in the sent packet train, the total number of packets in the packet train, the byte index in a packet train (e.g., offset in number of bytes of a packet in the train with respect to the beginning of the train), a total number of bytes in a train, a sent timestamp (i.e., when the packet train or packets in the packet train were sent), and one or more receive timestamp (which can be initialized to zero and are to be filled in by the receiver), or any other appropriate additional data.

In some embodiments, the arrival of each of the individual packets of the packet train is time-stamped by the receiver. In some embodiments, for each received packet, a reply is generated by the receiver. In various embodiments, the reply includes packet information (e.g., additional information described above) copied over along with the receive timestamp filled out with a time of reception of one or more packets. In some embodiments, a reply comprises an acknowledgment packet. An acknowledgment packet can be generated by the receiver for each of the individual packets, where the header of a given acknowledgment packet is the same or corresponds to a given individual packet. In some embodiments, the header is used to identify which packet of the sent packet train the acknowledgment packet corresponds to. In some embodiments, the given acknowledgment packet includes the timestamp for the corresponding given individual packet.

In some embodiments, the replies are transmitted back to the sender, and the information included in the replies is used to determine a bandwidth estimate of a link. For example, the returned information can be used to compute a total dispersion of the packet train or statistically analyzed to compute statistical measures associated with inter-packet spacings (e.g., time between reception of consecutive packets). In some embodiments, the information returned from the receiver is stored (e.g., in a database) to be used as historical data.

At 314, a determination of whether a dispersion threshold has been met is made. If the dispersion threshold is met, then the process continues to 318. In some embodiments, the determination comprises determining whether sufficient data (e.g., a packet train of sufficient length) has been transmitted to meet a pre-determined dispersion threshold or determine a bandwidth estimate. For example, the total dispersion experienced by the packet train may be computed based on timestamps received from the receiver, and the total experienced dispersion can be compared to the pre-determined dispersion threshold. In some embodiments, the predetermined dispersion threshold is based at least in part on the type of link being evaluated by the microbenchmark test. In some embodiments, the dispersion threshold is based on a previous bandwidth estimate of the link.

In some embodiments, the predetermined threshold dispersion is set such that if a transmitted packet train were to experience a total dispersion exceeding the threshold, the experienced total dispersion would be dictated primarily by the constrained bandwidth of the slowest link in a path, while buffering and other effects, such as jitter (e.g., among network components such as routers and modems), which can vary sporadically, and idle link wake up (e.g., modems that were previously asleep and were in low power modes need to undergo a wake up procedure to operate at full capacity) would contribute insignificantly to the total experienced dispersion time or would be compensated for (i.e., modem would first be woken up).

For example, if a person is on a cellular link, packets could be delayed by jitter measuring between 25-50 ms (millisecond). In that case, a dispersion threshold on a time scale of 150 ms (i.e., enough data traffic is sent resulting in at least 150 ms of total dispersion between the first and last packet of a packet train) would be large enough to be able to provide an estimate so that jitter contributes only a small portion of the total trip time of the packets. If a small number of packets is sent, however, they may come within a short period of time as compared to effects such as jitter, introducing error when estimating bandwidth. For example, because total dispersion can scale with the length of a packet train, if only a small number of packets is transmitted, only a small amount of dispersion caused by the constrained bandwidth in a link may result (e.g., 3 ms). However, if there is a random delay such as jitter along a path, causing a bump of 25 ms, the bandwidth estimate would be inaccurate as the measured dispersion is dominated by the random delay.

In some embodiments, instead of (or in addition to) determining whether a dispersion threshold time was met, an analysis of interpacket spacing (e.g., time between reception of one packet to the next) is used to determine whether a sufficient amount of data (e.g., length of the packet train) in the test round just run was sufficient to determine a bandwidth estimate of the link being tested. The interpacket spacings can be determined by computing the differences in receipt times of individual packets at the receiver, for example, using the timestamps generated by the receiver and returned in the replies to the sender.

In some embodiments, samples of interpacket spacings are collected and a distribution of the spacings is evaluated to determine statistical measures and metrics (e.g., mean, medium, standard deviation). The statistical measures are used to determine a bandwidth estimate of the link under consideration.

In some embodiments, the accuracy and/or validity of the collected data is determined. For example, based on received input about typical buffering and expected jitter time, it may be determined whether enough data has been collected to provide accurate results. For example, based on the determination, a total dispersion threshold of a different value may be used.

In some embodiments, if the length of the packet train is not sufficient to result in at least the total dispersion threshold, or an insufficient amount of data has been collected, then the process continues to 316, where the length of the packet train is incremented for a subsequent test round. In some embodiments, the length of the packet train is incremented with a fixed step or interval size. In some embodiments, the length of the packet train is incremented using a model such as an exponential model (e.g., packet train length increases by a power of 2 from one round to the next). Other models, such as linear models, are possible. In some embodiments, the model used to increment a packet train allows for the space of possible packet train lengths to be traversed quickly, so that a packet train of sufficient length to result in a dispersion of at least the dispersion threshold time can be reached in a relatively small number of rounds.

In some embodiments, the packet train length is not incremented. For example, if the initial packet train was pre-loaded and sent to "wake up" a link that was idle so that it would be fully powered on, the information associated with the initial wake up packet train could be discarded, and a new round with a packet train of the same length or a shorter length (e.g., base packet train length) as compared to the previously sent wake up train could be sent on the now fully powered up link.

As another example, the results of a benchmark round may be invalidated if one or more packets in the originally sent packet train are lost. The same benchmark round may then be run again (with a packet train of the same length), as the measured bandwidth could be affected depending on where the packet loss occurred.

As yet another example, an additional benchmark round may be triggered based on an analysis of the distribution of inter-packet spacings. For example, if the pattern of data is abnormal (i.e., the distribution has large gaps), the additional benchmark rounds may be triggered to determine if the gaps were normal due to the underlying network (e.g., systematic) or if the gaps were due to irregular errors.

After the packet train has been incremented, the process returns to 312 and a new test round with a packet train of the new length is transmitted.

In the event that the dispersion threshold was met, the result of the microbenchmark is provided (318). In some embodiments, an instantaneous bandwidth estimate is provided as a result. In some embodiments, a bandwidth estimate is determined based on the number and size of packets in the packet train and the total dispersion of the packet train. For example, the following function can be used to determine an estimate of the bandwidth of a link:

$$\text{Bandwidth} = (packet_{size}) * \frac{N-1}{r_N - r_1}$$

where N=the number of packets in the packet train, $r_N$ is the time of receipt by a receiver of the Nth packet in the packet train, and $r_1$ is the time of receipt by a receiver of the $1^{st}$ packet in the packet train.

In some embodiments, the results of the microbenchmark (e.g., determined estimated instantaneous bandwidth) are stored (e.g., in a database). In some embodiments, information calculated or received or otherwise determined during a benchmark test run is also recorded and/or stored. For example, some or all of the calculated inter-packet spacings for a test run can be stored to contribute to the historical data concerning a link. The stored information may also be used in subsequent test runs to facilitate those subsequent test runs. For example, if a previous test ended after 11 rounds, with a final packet train length of 1024 packets, the initial packet length of a subsequent benchmark test may be set to the length of the packet train in the second to last round of the previous test (e.g., 512 packets if using exponential model). The information associated with previous rounds can also be used to generate a moving average of the bandwidth of the link under consideration. The stored historical information associated with the link can be used to analyze the behavior of the link over time and to capture time variations of the link in real-time. Statistical measures (e.g., mean, median, standard deviation, etc.) associated with a distribution of the bandwidth estimates determined over time may be formed. The statistical measures may be used to determine whether a speed result (e.g., estimated bandwidth) should be filtered, removed, or not stored, for example, because the speed result is determined to be an outlier (e.g., estimated bandwidth was many standard deviations slower than mean) based on the distribution and the associated statistical measures.

Figure 4A:
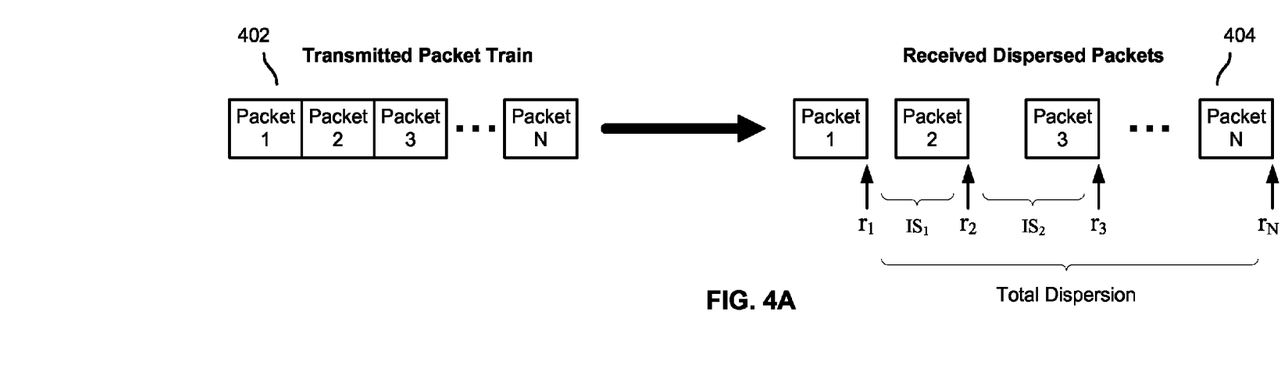
FIG. 4A is a diagram illustrating an example of packet dispersion.

FIG. 4A is a diagram illustrating an example of packet dispersion. In the example shown, packet train 402 includes N packets and is transmitted (e.g., from sender 102 of FIG. 1) to a receiver (e.g., receiver 106 of FIG. 1) over a link (which may be included in the path of links connecting a sender and a receiver).

As described above, the packets in a packet train can be sent out over a link (or on a buffer) together in a cluster or a tight burst in a continuous manner so that they are transmitted without interruption (e.g., without intervening packets from user traffic breaking up the packet train). Although the packets in the packet train are transmitted closely together initially (e.g., back-to-back), as they travel from node to node they can be spread out or dispersed based on the slowest link the packet train travels on (i.e., the throughput of a path including one or more links can be constrained by the slowest link in the path). For example, if a packet train of total size 1 MB is transmitted, and the packet train travels through a slow link that has a throughput of 1 Mbps, it will take 8 seconds for all of the packets in the packet train to be transferred through the slow link if there are no other effects. Effects such as buffer delays, jitter, idle/low power modes, etc., can introduce errors and delays that contribute to the total dispersion.

The total dispersion of the packet train can be measured (404), and the total dispersion can be used to determine an estimate of the bandwidth of a link (e.g., slowest link in the path between a sender and a receiver which constrains the total throughput). In some embodiments, the total dispersion time experienced by the packet train in travelling from the sender to the receiver comprises a difference in time between when the last packet of the packet train and the first packet of the packet train were received (e.g., $r_N - r_1$).

In some embodiments, in addition to or instead of measuring the total dispersion of a packet train, dispersion at the packet level is measured, and the inter-packet spacings (e.g., time of receipt between consecutive packets) of the packets in the packet train can be used to determine an estimate of the bandwidth of a link. For example, the distribution of the inter-packet spacings can be analyzed, as well as other statistical measures (e.g., means, medians, standard deviations, etc.) associated with the distribution.

Figure 4B:
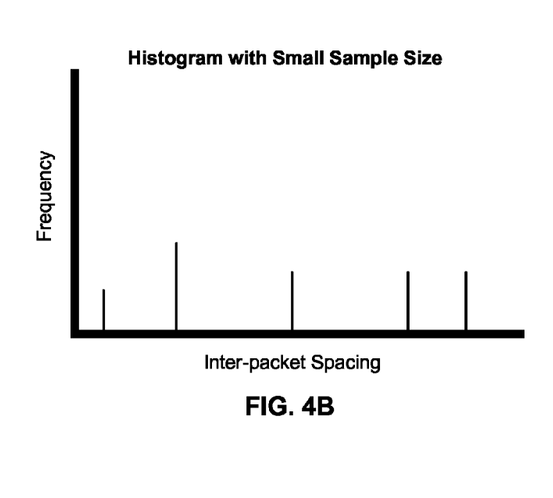
FIG. 4B is a diagram illustrating an example distribution of inter-packet spacings.
Figure 4C:
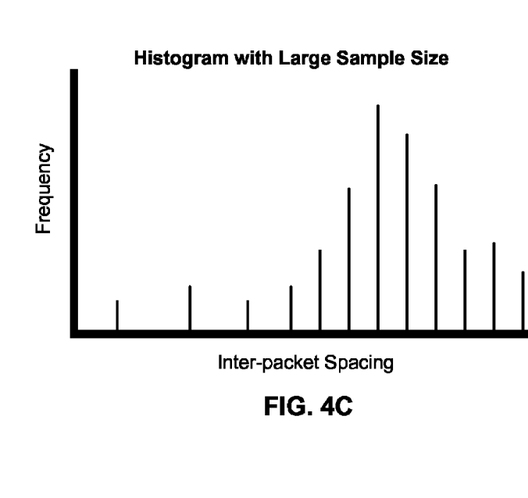
FIG. 4C is a diagram illustrating an example distribution of inter-packet spacings.

FIGS. 4B and 4C are diagrams illustrating example distributions of inter-packet spacings. In the example of FIG. 4B, a relatively small number of samples of inter-packet spacings have been collected, and a distribution (e.g., Gaussian) has not yet emerged. In the example of FIG. 4C however, a large number of inter-packet spacing samples have been collected. In some embodiments, the sample of inter-packet spacings is collected for the packets from a single packet train. In some embodiments, the inter-packet spacings associated with multiple packet trains (e.g., all packets from some or all of the rounds within a benchmark test) are stored and collected. In some embodiments, inter-packet spacings across multiple tests are stored as historical data and are used to determine an estimate of the bandwidth of a link.

In some embodiments, the distribution of inter-packet spacings is analyzed (e.g., by the microbenchmark engine) and various statistical measures such as mean, median, standard deviation, etc. are determined. In some embodiments, based on the statistical measures, measured and collected samples may be filtered before being stored or used to evaluate the bandwidth of a link. For example, if a measured inter-packet spacing is particularly long due to a random effect such as jitter, it may be filtered and ignored and not stored because it was determined to be an outlier. In some embodiments, stored samples may be filtered, removed, and/or culled after a large enough sample size of inter-packet spacings has been collected and statistical measures of the distribution have been determined.

Figure 5:
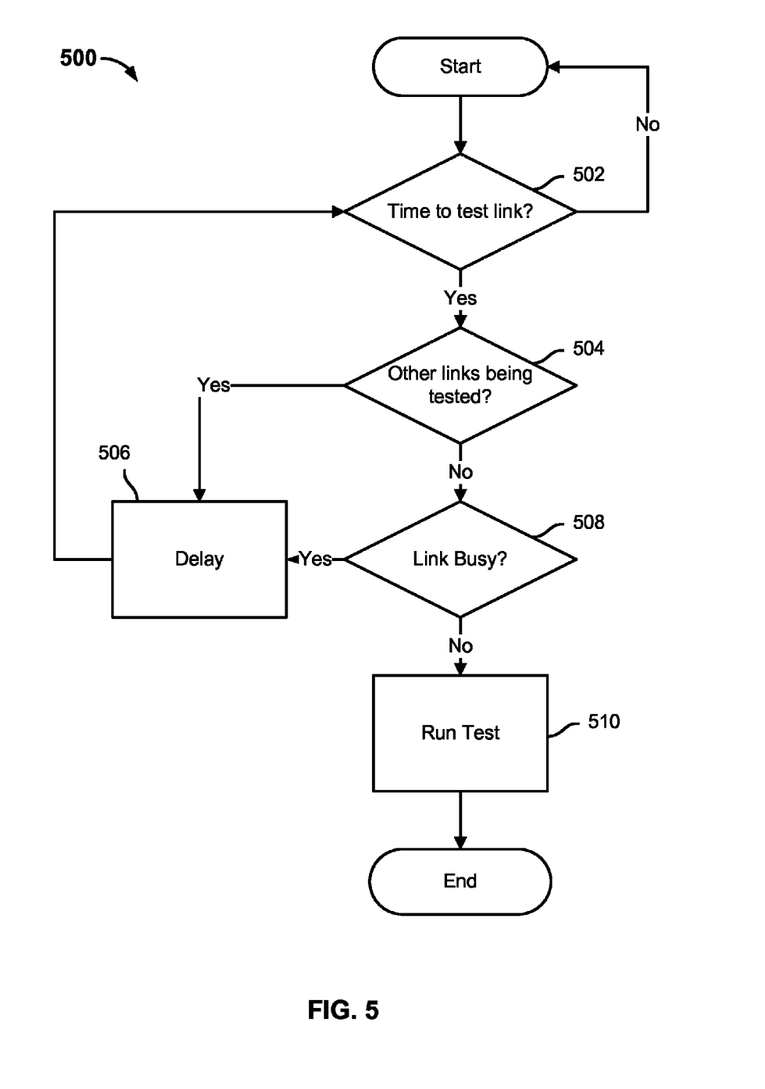
FIG. 5 is a flow diagram illustrating an embodiment of a process for coordinating link microbenchmarking.

FIG. 5 is a flow diagram illustrating an embodiment of a process for coordinating link microbenchmarking. In some embodiments, process 500 is executed by coordination engine 204 of FIG. 2. The process begins (502) when a determination is made as to whether it is time to test a link under consideration. In some embodiments, a link is scheduled to run periodically at a nominal measurement frequency (e.g., every 30 or 60 seconds). A link can also be scheduled to be tested at a random offset from a nominal measurement frequency. In some embodiments, the random offset is bounded within a window (e.g., ±5 seconds about nominal frequency). In some embodiments, the random offset is used in order to statistically avoid measurement of the link under consideration at the same time that associated links are being measured. If it is not time to test the link, the process may begin again at a later time (e.g., according to a nominal measurement frequency).

If it is time to test the link, it is determined whether there are other links currently being tested (504). In the event that another link is being tested, the process continues to 506, where the test of the link is delayed. In various embodiments, the applied delay comprises a fixed delay, a random delay, or any other appropriate delay. The delay of 506 can be applied to provide adequate time between various benchmark tests on various links, preventing bunching or overlapping and minimizing the impact that the benchmark test has on user traffic.

If there is not another link being tested the process continues to 508 where it is determined whether the link is busy or not (e.g., due to user traffic). If the link is busy, the link may not be tested so as not to impact user traffic. In some embodiments, a link is determined to be busy based on a utilization percentage of a link. In the event that the link is determined to be busy, the process continues to 506, where a delay is applied. In the event that the link under consideration is not busy, the process continues to 510, where the benchmark test of the link under consideration is run. In some embodiments, the coordination engine also performs policy enforcement. For example, if it has been indicated that the link is not to be used (e.g., by a user or application), then the coordination engine will not test the link.

Figure 6:
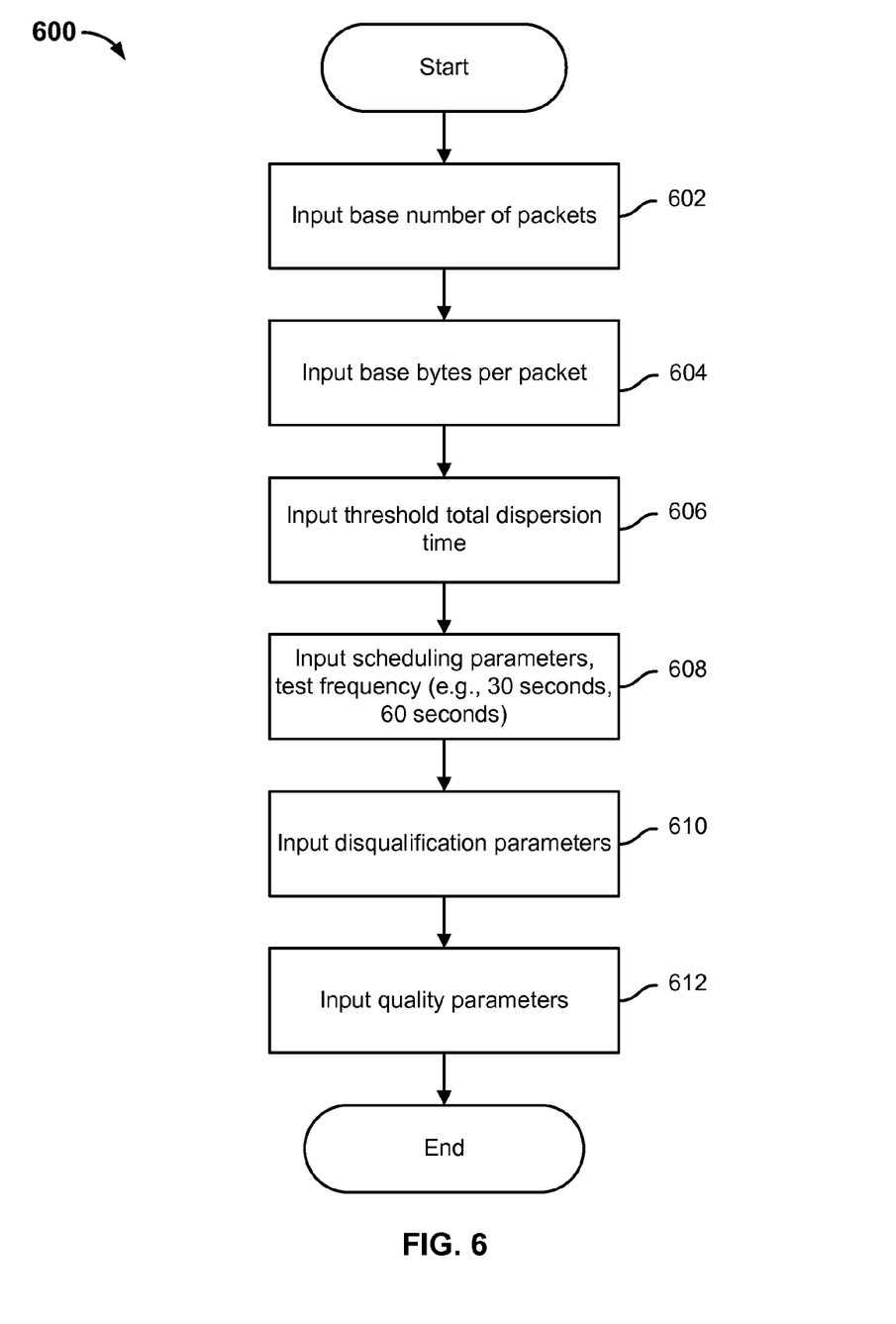
FIG. 6 is a flow diagram illustrating an embodiment of a process for configuring link microbenchmarking.

FIG. 6 is a flow diagram illustrating an embodiment of a process for configuring link microbenchmarking. In some embodiments, process 600 of FIG. 6 is performed by configuration engine 202 of FIG. 2. In some embodiments, the process of configuring link microbenchmarking comprises receiving one or more tunable parameters associated with configuring link microbenchmarking. In various embodiments, the tunable parameters are inputted (e.g., by a user), are set by default, or are received in any other appropriate manner. In the example shown, at 602, a base number of packets (e.g., 2, 4, etc.) to be included in an initial packet train is inputted. At 604, a base size of an individual packet (e.g., in bytes, MB, KB, etc.) is inputted. At 606, a threshold total dispersion time is inputted. At 608, scheduling parameters are inputted. In various embodiments, scheduling parameters include a nominal measurement frequency (e.g., every 30 seconds, 60 seconds, etc.), random offset window size (e.g., ±5 seconds about test frequency), or any other appropriate scheduling parameters.

At 610, microbenchmark disqualification parameters are inputted. In some embodiments, disqualification parameters include criteria used to disqualify or invalidate a benchmark test. For example, for data transmitted over wireless links, interference can cause orders of magnitude greater packet loss than is typically seen on a wired network. In some embodiments, disqualification criteria include a threshold number of lost packets. If the number of packets lost during a round of testing exceeds the threshold, then the test is disqualified. In some embodiments, the threshold can be a different measure or value representing lost packets, such as a measure indicating a percentage of packets in a packet train that were lost. In some embodiments, the threshold number of lost packets is a tunable parameter.

At 612, quality parameters are inputted. In some embodiments, quality parameters are used to determine or measure the quality of a test. In some embodiments, measuring the quality of a test is based at least in part on calculated statistical measures. For example, when considering inter-packet spacings, the determination of whether a sample inter-packet spacing is an outlier and can be ignored may be based at least in part on the mean and standard deviation of the distribution of collected inter-packet spacings and various other statistical measures.

Figure 7:
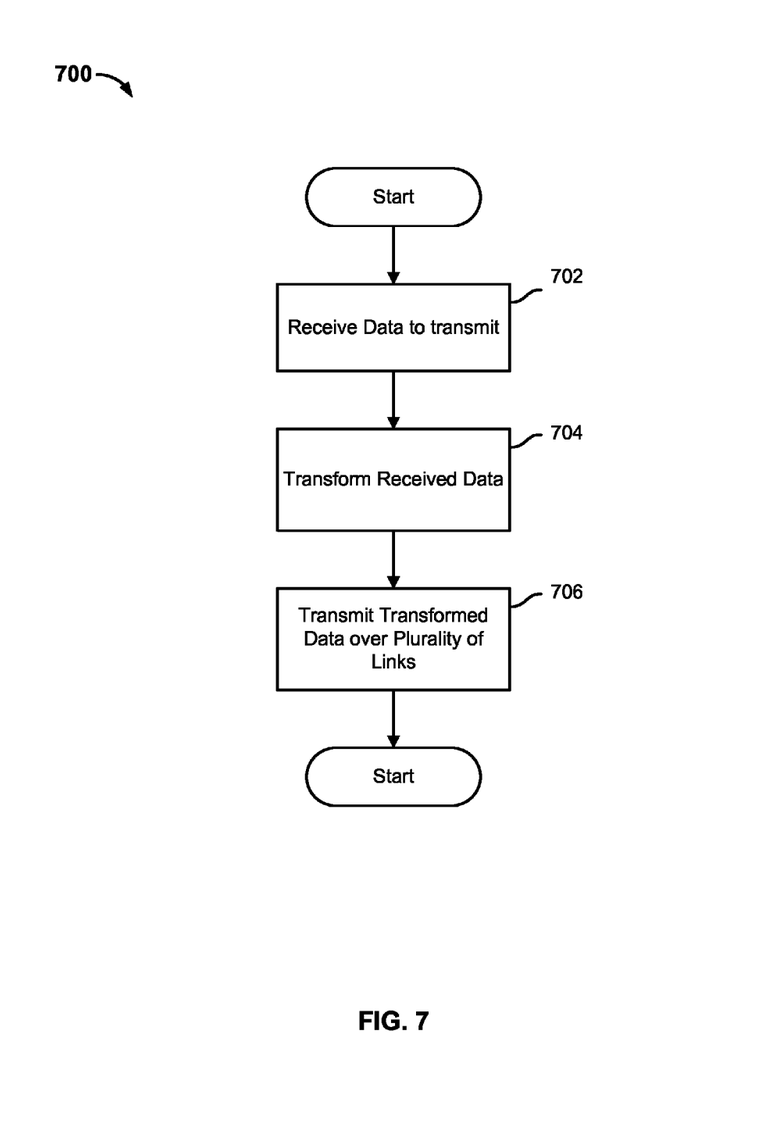
FIG. 7 is a flow diagram illustrating an embodiment of a process for performing aggregation using the results of link microbenchmarking.

FIG. 7 is a flow diagram illustrating an embodiment of a process for performing aggregation using the results of link microbenchmarking. In some embodiments, process 700 of FIG. 7 is executed by aggregation engine 208 of FIG. 2. In the example shown, at 702, data to transmit is received (e.g., user traffic). At 704, the received data is transformed. In some embodiments, transforming the received data includes transforming packets included in the data into fractional packets.

In some embodiments, the decision of how to split the data packets into fractional packets is based at least in part on link performance data/information. In some embodiments, link performance information comprises information determined through link microbenchmarking. At 706, the transformed data (e.g., fractional packets) is transmitted over a plurality of links. In some embodiments, fractional packets are assigned to links based at least in part on link performance information determined through link microbenchmarking. In some embodiments, the link performance information includes the results of link microbenchmarking. In some embodiments, the results are combined with information associated with latency and loss information associated with one or more links.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for measuring a speed of a link, including:
   a processor configured to:
      send an initial packet train having an initial length over the link;
      determine a speed result based at least in part on an actual time of reception of individual packets in the initial packet train;
      evaluate a quality of the speed result for the initial packet train according to a constraint, wherein evaluating the quality of the speed result includes determining whether a total dispersion of the initial packet train exceeds a threshold dispersion time; and
      determine whether to send a subsequent packet train based at least in part on the quality of the speed result; and
   a memory coupled to the processor and configured to provide the processor with instructions.

2. The system as in claim 1, wherein a packet train includes a plurality of packets.

3. The system as in claim 1, wherein evaluating the quality of the speed result includes evaluating a distribution of inter-packet delays.

4. The system as in claim 1, wherein the processor is further configured to determine whether an associated link is being measured and delay measurement of the link in the event it is determined that the associated link is being measured.

5. The system as in claim 1, wherein the measurement is made with a random offset from a nominal measurement frequency in order to statistically avoid measurement of the link at the same time that associated links are being measured.

6. The system as in claim 1, wherein the measurement is scheduled to avoid measurement of the link at the same time that associated links are being measured.

7. The system as in claim 1, wherein measurement of the link is avoided in the event that the link is busy.

8. The system as in claim 1, wherein measurement of the link is avoided in the event that it has been indicated that the link is not to be used.

9. The system as in claim 1, wherein the processor is further configured to send the subsequent packet train, wherein the subsequent packet train is longer than the initial packet train.

10. The system as in claim 9 wherein the subsequent packet train is exponentially longer than the initial packet train.

11. The system as in claim 1, wherein the processor is further configured to determine the speed result based at least in part on the subsequent packet train, wherein determining the speed result comprises excluding the individual packets in a previously sent packet train.

12. The system as in claim 11 wherein determining the speed result includes evaluating packets in the initial packet train.

13. The system as in claim 1, where determining the speed result comprises excluding outliers.

14. The system as in claim 1, wherein determining the speed result is based at least in part on a packet size, a measure of a number of packets in a packet train, and a total dispersion.

15. The system as in claim 1, wherein a packet size of an individual packet is 1024 bytes.

16. The system as in claim 1, wherein a packet size of an individual packet is tunable.

17. The system as in claim 1, wherein the threshold dispersion time is based at least in part on a priori knowledge of a type of the link.

18. The system as in claim 1, wherein the threshold dispersion time is based at least in part on a previous measurement of the link.

19. The system as in claim 1, wherein the threshold dispersion time is tunable.

20. The system as in claim 1, wherein the initial length of the initial packet train is based at least in part on a length required to obtain a previous measurement of satisfactory quality.

21. The system as in claim 1, wherein the processor is further configured to store the speed result.

22. The system as in claim 1, wherein the speed result comprises a moving average.

23. The system as in claim 1, wherein the processor is further configured to measure the speed of the link periodically.

24. The system as in claim 1, wherein the speed result is disqualified in the event that packets are lost.

25. A method for measuring a speed of a link, including:
sending an initial packet train having an initial length over the link;
determining a speed result based at least in part on an actual time of reception of individual packets in the initial packet train;
evaluating a quality of the speed result for the initial packet train according to a constraint, wherein evaluating the quality of the speed result includes determining whether a total dispersion of the initial packet train exceeds a threshold dispersion time; and
determining whether to send a subsequent packet train based at least in part on the quality of the speed result.

26. A computer program product for measuring a speed of a link, the computer program product being embodied in a non-transitory tangible computer readable storage medium and including computer instructions for:
sending an initial packet train having an initial length over the link;
determining a speed result based at least in part on an actual time of reception of individual packets in the initial packet train;
evaluating a quality of the speed result for the initial packet train according to a constraint, wherein evaluating the quality of the speed result includes determining whether a total dispersion of the initial packet train exceeds a threshold dispersion time; and
determining whether to send a subsequent packet train based at least in part on the quality of the speed result.

* * * * *